United States Patent
Wildgoose et al.

(10) Patent No.: US 12,339,249 B2
(45) Date of Patent: Jun. 24, 2025

(54) AUTOMATICALLY STANDARDISING SPECTROMETERS

(71) Applicant: Micromass UK Limited, Wilmslow (GB)

(72) Inventors: Jason Lee Wildgoose, Stockport (GB); Martin Raymond Green, Bowdon (GB); Keith Richardson, High Peak (GB); Daniel James Kenny, Knutsford (GB); David Gordon, Middlewich (GB); Kate Whyatt, Sutton Weaver (GB)

(73) Assignee: Micromass UK Limited, Wilmslow (GB)

( * ) Notice: Subject to any disclaimer, the term of this patent is extended or adjusted under 35 U.S.C. 154(b) by 371 days.

(21) Appl. No.: 17/767,227

(22) PCT Filed: Oct. 6, 2020

(86) PCT No.: PCT/GB2020/052468
§ 371 (c)(1),
(2) Date: Apr. 7, 2022

(87) PCT Pub. No.: WO2021/069882
PCT Pub. Date: Apr. 15, 2021

(65) Prior Publication Data
US 2022/0384168 A1    Dec. 1, 2022

(30) Foreign Application Priority Data
Oct. 7, 2019 (GB) .................. 1914451

(51) Int. Cl.
*G01N 27/623* (2021.01)
*G01N 27/622* (2021.01)
*H01J 49/00* (2006.01)

(52) U.S. Cl.
CPC ......... *G01N 27/623* (2021.01); *G01N 27/622* (2013.01); *H01J 49/0009* (2013.01); *H01J 49/0036* (2013.01); *H01J 49/0045* (2013.01)

(58) Field of Classification Search
CPC . G01N 27/623; G01N 27/622; H01J 49/0009; H01J 49/0036; H01J 49/0045;
(Continued)

(56) References Cited

U.S. PATENT DOCUMENTS

| 5,545,895 A | 8/1996 | Wright et al. |
| 7,189,967 B1 * | 3/2007 | Whitehouse .......... H01J 49/063 250/292 |

(Continued)

FOREIGN PATENT DOCUMENTS

| CN | 102484030 A | 5/2012 |
| CN | 108987238 A | 12/2018 |

(Continued)

OTHER PUBLICATIONS

Search Report for GB Application No. GB1914451.8, mailed Apr. 1, 2020.
(Continued)

*Primary Examiner* — David P Porta
*Assistant Examiner* — Mamadou Faye
(74) *Attorney, Agent, or Firm* — Goodwin Procter LLP

(57) ABSTRACT

A method of mass spectrometry is disclosed comprising: a step (10) of analysing a reference compound in a first mass spectrometer and outputting mass spectral data in response thereto; a step (20) of analysing the reference compound in a second, different mass spectrometer and outputting mass spectral data in response thereto; and a step (30) of automatically adjusting an operational parameter, duty cycle (e.g. duty cycle of data acquisition), or acquired spectral data of at least one mass spectrometer such that, for the same (Continued)

(given) consumption of reference compound by the spectrometer, the statistical precision of quantification (the number of detected ions) and/or of mass measurement (the mass resolution) by the mass spectrometer is substantially the same as that of the other mass spectrometer. A similar method of ion mobility spectrometry is disclosed.

19 Claims, 3 Drawing Sheets

(58) Field of Classification Search
CPC .. H01J 49/004; H01J 49/0027; H01J 49/0031; H01J 49/025
See application file for complete search history.

(56) References Cited

U.S. PATENT DOCUMENTS

| | | | |
|---|---|---|---|
| 2005/0086017 | A1 | 4/2005 | Wang |
| 2007/0158546 | A1 | 7/2007 | Lock et al. |
| 2009/0001262 | A1* | 1/2009 | Visser .............. G06F 18/21342 250/281 |
| 2011/0282587 | A1* | 11/2011 | Jones ..................... G06F 17/10 702/22 |
| 2014/0117219 | A1 | 5/2014 | Kenny |
| 2015/0212132 | A1 | 7/2015 | Green et al. |
| 2016/0352590 | A1* | 12/2016 | Stadnisky ............... H04L 67/12 |
| 2018/0100858 | A1* | 4/2018 | Blume ............. G01N 33/57419 |
| 2018/0174817 | A1* | 6/2018 | Green ................. H01J 49/4215 |
| 2020/0124576 | A1* | 4/2020 | Kobold ................. G01N 30/88 |

FOREIGN PATENT DOCUMENTS

| | | |
|---|---|---|
| WO | 1996024832 A1 | 8/1996 |
| WO | 2008100941 A2 | 8/2008 |
| WO | 2009127808 A2 | 10/2009 |
| WO | 2012048227 A2 | 4/2012 |
| WO | 2013004493 A1 | 1/2013 |

OTHER PUBLICATIONS

International Search Report and Written Opinion for International Application No. PCT/GB2020/052468, mailed Mar. 9, 2021.
Combined Search and Examination Report for GB Application No. GB2015822.6, mailed Mar. 11, 2021.
Gabelica, V., et al., "Recommendations for reporting ion mobility Mass Spectrometry measurements", Mass Spectrometry Reviews, 38(3):291-320, Feb. 1, 2019.
Vereyken, L., et al., "High-Resolution Mass Spectrometry Quantification: Impact of Differences in Data Processing of Centroid and Continuum Data", Journal of the American Society for Mass Spectrometry, 30(2):203-212, Dec. 17. 2018.
Addona, T.A., et al., "Multi-site assessment of the precision and reproducibility of multiple reaction monitoring-based measurements of proteins in plasma", Nature Biotechnology, 27(7):633-641, Jul. 1, 2009.

* cited by examiner

| | N (s⁻¹) | Res |
|---|---|---|
| 1 | 2000 | 30,000 |
| 2 | 1500 | 25,000 |
| 3 | 1000 | 20,000 |
| 4 | 500 | 38,000 |
| 5 | 1200 | 40,000 |

| | N (s⁻¹) | Res |
|---|---|---|
| 1 | 1000 | 20,000 |
| 2 | 1000 | 20,000 |
| 3 | 1000 | 20,000 |
| ~~4~~ | ~~500~~ | ~~38,000~~ |
| 5 | 1000 | 20,000 |

AUTOMATICALLY STANDARDISING SPECTROMETERS

CROSS-REFERENCE TO RELATED APPLICATIONS

This application is a U.S. national phase filing claiming the benefit of and priority to International Patent Application No. PCT/GB2020/052468, filed on Oct. 6, 2020, which claims priority from and the benefit of United Kingdom patent application No. 1914451.8 which was filed on Oct. 7, 2019. The entire contents of these applications are incorporated herein by reference.

FIELD OF THE INVENTION

The present invention relates generally to methods and systems for standardising the response of multiple different spectrometers.

BACKGROUND

Multiple spectrometers of the same design are often utilized to increase the efficiency and throughput of the analysis of samples. These instruments may be located in the same facility or at different facilities. Some types of sample analysis, such as large-scale proteomics or metabolomics studies, rely on being able to correlate analytical data obtained by different instruments located in the same laboratory or facility, or in different laboratories or facilities. For example, if multiple different instruments are used to perform quality control analysis on different samples, it is important that the results of the analysis of a given sample on the different instruments would be consistent. In order to cross-correlate analytical results obtained by different instruments it is desired that the quantitative and qualitative performance of these instruments is as similar as possible.

For example, if the absolute sensitivity of two instruments performing the same analysis is different, it is possible for the more sensitive instrument to reveal compounds which are not detected by the less sensitive instrument, due to their respective detection limits. At first glance this may be perceived as advantageous. However, even if samples containing the same compounds are analysed by the two instruments it the analytical results may indicate that the samples comprise different compounds, whereas in reality the instruments simply have different responses. For example, if two instruments are used to compare batches of chemical formulations prepared by the same process, the different responses of the two instruments imply that there is a deviation in the composition of the formulation being analysed, rather than the instruments simply having different responses. This can be misleading.

Similarly, if the resolution of one instrument is higher than another, peaks may be resolved by the higher resolution instrument which are unresolved on the lower resolution instrument. Again, analysis of a given analyte on two different instruments may provide different analytical results. As such, comparison of the analytical results from the two different instruments can be misleading as it may imply differences between the samples being analysed rather than differences in the instruments themselves.

It is common for there to be a level of variation in the performance of similar mass spectrometers (and their components), e.g. in part due to variations in manufacturing and set-up. The performance specifications of the instruments are generally set to accommodate performance at the lower end of the spectrum in order to maximize the instrument production yield. For example, this may be important when employing chemometric analysis approaches to match complex spectral or chromatographic patterns to database data, e.g. when using direct ionization for food authenticity, speciation, bacterial ID, or using MS tissue imaging for diagnostic purposes.

It is common for an instrument manufacturer to guarantee a minimum performance specification for an instrument at the point of sale. This performance specification may be the sensitivity (e.g. charge detected for a given consumption of a reference material under standard conditions) or resolving power of the instrument, or another criterion of the instrument. In order to ensure that the instruments that are manufactured will achieve this guaranteed minimum performance specification, the manufacturer will often design the manufacturing process to produce instruments that exceed this performance specification. However, as the amount by which the different instruments exceed the performance specification has not previously been considered important and is unspecified, this may result in a significant variation in the performance of the instruments.

SUMMARY

The present invention provides a method of mass spectrometry comprising: analysing a reference compound in a first mass spectrometer and outputting mass spectral data in response thereto; analysing the reference compound in a second, different mass spectrometer and outputting mass spectral data in response thereto; and adjusting at least one of an operational parameter, duty cycle, or acquired spectral data of one or both of the spectrometers such that, for the same consumption of the reference compound by the spectrometers, the statistical precision of quantification and/or the statistical precision of mass measurement of the spectral data output by the first spectrometer for the reference compound is substantially the same as for the spectral data output by the second spectrometer.

The present invention ensures that different spectrometers have substantially the same statistical precision for the analysis of the same reference compound. Once the settings of the spectrometers that achieve this have been determined, the spectrometers then use these settings in subsequent analyses. This may be important where the analyses performed by different spectrometers need to be compared to each other or to a reference spectrum.

It is known in the art that different spectrometers may have different responses for the same compound and that in some circumstances it may be desirable to standardise their responses. However, conventionally this has been performed by comparing experimentally acquired spectral data for each spectrometer with "unbiased" reference spectral data, and then using this comparison to generate a mathematical transfer function for use in scaling mass spectral data that is subsequently acquired by the spectrometer so as to obtain an "unbiased" spectrum.

However, whilst such techniques may enable different mass spectrometers to provide mass spectral data having the same intensities for the analysis of the same compound, they do not provide the different spectrometers with the same statistical precision. Therefore, data from the different mass spectrometers is not truly comparable. In contrast, in embodiments described herein, the mass spectral data output from each mass spectrometer is representative of data relating to substantially the same number of detected ions (for the same consumption of the same compound).

Although first and second spectrometers have been described above, it is also contemplated that the reference compound may be analysed by a third (or further) mass spectrometer that outputs mass spectral data in response thereto; and the method may comprise adjusting at least one of an operational parameter, duty cycle, or acquired spectral data of the third (or further) spectrometer such that, for the same consumption of the reference compound by the spectrometers, the statistical precision of quantification and/or the statistical precision of mass measurement of the spectral data output by the first spectrometer for the reference compound is substantially the same as for the spectral data output by the third (or further) spectrometer. The responses of any number of spectrometers may be normalised or standardised by the methods described herein, e.g. $\geq 2$, $\geq 3$, $\geq 4$, $\geq 5$, $\geq 6$, $\geq 7$, $\geq 8$, $\geq 9$, or $\geq 10$ spectrometers may be normalised or standardised.

The reference compound used in the present invention may be introduced into each of the spectrometers at a known concentration and rate of introduction (and for the same duration) so that the spectrometers have the same consumption of the reference compound.

It will be appreciated that the procedure described herein for analysing the reference compound using the spectrometers may be applied to one or more further reference compounds. The multiple reference compounds may be introduced into and analysed by each spectrometer at separate times or simultaneously.

Said one or both of the spectrometers may automatically adjust at least one of said operational parameter, duty cycle, or acquired spectral data so that the statistical precision of quantification and/or the statistical precision of mass measurement of the spectral data output by the first spectrometer for the reference compound is substantially the same as for the spectral data output by the second spectrometer for the reference compound.

The method may comprise: (i) selecting one or more target criteria for spectral data output by the spectrometers, the one or more target criteria being representative of the desired statistical precision of quantification and/or the statistical precision of mass measurement of the spectral data output by the spectrometers (for the reference compound); (ii) performing said step of adjusting at least one of an operational parameter, duty cycle, or acquired spectral data of one or both of the spectrometers until said one or both spectrometers is configured with settings such that they output spectral data having substantially said one or more target criteria; and (iii) setting said one or more spectrometers to operate with said settings when subsequently analysing further analytical samples.

One or both of the spectrometers may have a statistical precision of quantification and/or statistical precision of mass measurement that is above a pre-selected desired value when one or both of said spectrometers initially analyse said reference compound; and said step of adjusting may then be performed on one or both of said spectrometers until the performance of one or both spectrometers is lowered such that its statistical precision of quantification and/or statistical precision of mass measurement for the reference compound is at said pre-selected desired value.

The method may comprise determining that one of the spectrometers is not able to provide said pre-selected desired value of statistical precision of quantification and/or statistical precision of mass measurement by adjusting said at least one of an operational parameter, duty cycle, or acquired spectral data of the spectrometers; and in response thereto, determining and/or indicating that this spectrometer should not be used for the subsequent analysis of samples and/or that the spectrometer requires maintenance.

The indication may be provided by an electronic display forming part of, or connected to, the spectrometer, or by other means controlled by the spectrometer.

The method may then comprise servicing or otherwise modifying the spectrometer so that it is able to provide said pre-selected desired value of statistical precision of quantification and/or statistical precision of mass measurement by adjusting at least one of an operational parameter, duty cycle, or acquired spectral data of the spectrometers.

The method may comprise selecting said desired statistical precision of quantification and/or the statistical precision of mass measurement (for the reference compound) as the statistical precision of quantification and/or the statistical precision of mass measurement of one of the spectrometers; and then adjusting at least one of an operational parameter, duty cycle, or acquired spectral data of the other spectrometer until said other spectrometer substantially has said desired statistical precision of quantification and/or the statistical precision of mass measurement (for the reference compound).

The desired statistical precision of quantification and/or the statistical precision of mass measurement of said one of the spectrometers may be the initial values of these parameters without any adjustment (of at least one of an operational parameter, duty cycle, or acquired spectral data) in response to detecting the reference compound. For example, the same reference compound having the same concentration may be analyzed under the same analysis conditions on each of the spectrometers. The performances of the spectrometers may then be determined and said desired statistical precision may be selected to be the desired statistical precision of one of the spectrometers, such as the statistical precision of the spectrometer having the lowest performance. The performance of each of the other spectrometers may then be adjusted such that all of these spectrometers have substantially the same statistical precision.

The method may comprise selecting a minimum performance threshold for the statistical precision of quantification and/or the statistical precision of mass measurement of the spectrometers; wherein said step of selecting the desired statistical precision of one of the spectrometers comprises selecting a statistical precision of quantification and/or the statistical precision of mass measurement that is at or above said minimum performance threshold.

If the performance of any of the spectrometers is below the threshold then these performances are not used as the desired statistical precision and these spectrometers may not be used for the subsequent analysis of samples. It may be indicated (e.g. via an electronic display or other alert controlled by the spectrometer) that these poorly performing spectrometers require maintenance. The method may then comprise performing such maintenance.

The statistical precision of the lowest performing spectrometer that is above the threshold may be used as the desired value for adjusting the statistical precision of the other spectrometers.

At least one of the spectrometers may analyse the same reference compound at a plurality of time intervals and the mass spectral data from these analyses may then be compared to each other and/or to reference spectral data so as to determine if the statistical precision of the spectral data output by that spectrometer changes with time. Optionally, when it is determined that there is a change in the statistical precision of the spectrometer, the method comprises adjusting said at least one of an operational parameter, duty cycle, or acquired spectral data of that spectrometer so as to change the statistical precision of spectral data output by that spectrometer.

The spectrometers may analyse the same reference compound at a plurality of time intervals and the mass spectral data from these analyses may be compared to each other and/or to reference spectral data so as to determine if the statistical precisions of the different spectrometers are substantially the same at each of the plurality of time intervals. Optionally, when it is determined that the statistical precisions are not the same, the method comprises adjusting said at least one of an operational parameter, duty cycle, or acquired spectral data of at least one of the spectrometers so that they have the same statistical precision.

The method may comprise controlling the number of ions of the reference compound arriving at an ion detector of the first spectrometer to be substantially the same as the number of ions of the reference compound arriving at an ion detector of the second spectrometer, for said given consumption of the reference compound, so that the spectrometers have substantially the same quantitative precision.

The method may comprise adjusting the mass resolution of at least one of the spectrometers so that the spectrometers have the same mass resolution, for said reference compound; and/or adjusting the spectral data acquired by at least one of the spectrometers, in a post-processing step, so that the data output from the spectrometers has the same mass resolution, for said reference compound.

The mass spectrometers may have the same absolute resolution as each other and may provide the same mass peak width (e.g. FWHM) for said reference compound.

The mass resolution of one or both of the spectrometers may be adjusted so that the spectrometers have substantially the same statistical precision of quantification and/or mass measurement.

Said step of adjusting the mass resolution may be performed in real time. In order to adjust the resolution the spectrometer may be controlled so as to vary the velocity, spatial spread or focusing of the ions passing therethrough. This may be performed by adjusting voltages applied to electrodes of the spectrometer. The spectrometer may be tuned or detuned so as to increase or reduce the resolution, respectively.

Said step of adjusting the mass resolution may comprise: (i) adjusting mass to charge ratios of the ions detected by said at least one of the spectrometers so as to provide data at a lower resolution; or (ii) perturbing detection times of ions detected by said at least one of the spectrometers so as to provide data at a lower resolution, wherein the spectrometers mass analyse ions based on their time of detection.

For example, for a time of flight mass analyser, such as an orthogonal time of flight mass analyser, the mass resolution may be altered by adding timing jitter into the detection system. The timing jitter may be added, for example, by altering the discriminator level used to trigger the start of each time of flight transient with time.

The resolution of the spectral data output by a spectrometer may be varied by a post-processing step performed on the acquired data. For example, the spectral data acquired may be distorted in a post-processing step so as to artificially lower the resolution.

The spectral data may be adjusted in the post-processing step by filtering the spectral data so as to provide data at a lower resolution.

The method may comprise adding noise, such as ion signal intensity variance, to the spectral data acquired by at least one of the spectrometers, in a post-processing step, so that the spectrometers have the same statistical precision of quantification.

The method may comprise adjusting the duty cycle of data acquisition in one or both of the spectrometers so that the spectrometers have substantially the same statistical precision of quantification and/or mass measurement.

The method may comprise adjusting one or more of the following, in one or both of the spectrometers, so that the spectrometers have substantially the same statistical precision of quantification and/or mass measurement: (i) the ionisation efficiency of an ion source in one or both of the spectrometers; and/or (ii) the ion transmission through one or both of the spectrometers; and/or (iii) the ion detection efficiency of a detector system in one or both of the spectrometers.

The present invention also provides a system configured to perform the method described above, comprising: a first mass spectrometer; a second mass spectrometer; and control circuitry configured to: control each of the first and second mass spectrometers so as to each mass analyse a reference compound and output mass spectral data in response thereto; and adjust at least one of an operational parameter, duty cycle, or acquired spectral data of one or both of the spectrometers such that, for the same consumption of the reference compound by the spectrometers, the statistical precision of quantification and/or the statistical precision of mass measurement of the spectral data output by the first spectrometer for the reference compound is substantially the same as for the spectral data output by the second spectrometer.

The system may be configured (e.g. using control circuitry) to supply the reference compound to the first and second mass spectrometers at the same concentration and flow rate (and optionally for the same duration) such that the spectrometers have said same consumption of the reference compound.

The system may comprise an informatics hub that is connected to the first and second spectrometers by a communications network, such as the internet, so that it can receive data from the spectrometers. The network may be hard-wired or wireless.

The system may have control circuitry that causes the spectrometers to analyse the same reference compound at a plurality of time intervals and send data representative of the mass spectral data from these analyses to the informatics hub. The informatics hub may have (or may be connected to) a processor and circuitry that compares the data from the spectrometers with each other and/or to reference data so as to determine if the statistical precision of the spectral data output by the different spectrometers is substantially the same at the plurality of time intervals. If it is determined that there is a change in the statistical precision of one of the spectrometers, the hub may be configured to send instructions to said one of the spectrometers so as to adjust said at least one of an operational parameter, duty cycle, or acquired spectral data of that spectrometer such that the statistical precision of spectral data output by that spectrometer is substantially the same as for the spectral data output by the other spectrometer.

The present invention also provides a mass spectrometer configured to generate mass spectral data and to transmit data representative of the mass spectral data to a remote informatics hub, e.g. of the type described herein.

The present invention also provides an informatics hub configured to receive, over a network, data representative of mass spectral data from different mass spectrometers, optionally at a plurality of different time intervals, and to compare the data from the spectrometers with each other and/or reference data so as to determine if the statistical precision of the spectral data output by the different spectrometers is substantially the same, optionally at each of the plurality of time intervals.

If it is determined that there is a change in the statistical precision of one of the spectrometers, the hub may be configured to send instructions to one of the spectrometers so as to adjust at least one of an operational parameter, duty cycle, or acquired spectral data of that spectrometer such that the statistical precision of spectral data output by that spectrometer is substantially the same as for the spectral data output by the other spectrometer.

The present invention also provides a computer program comprising instructions which, when the program is executed by the first and second mass spectrometers (or one or more computer controlling the spectrometers), causes the spectrometers to perform the method described herein.

In the techniques described herein, the detector gain may be substantially the same for all of the spectrometers.

The spectrometers may be set-up and tuned in a substantially identical manner, e.g. according to the manufacturer's instructions.

Although embodiments have been described above that relate to a mass spectrometer, it is also contemplated that the techniques described herein may be used in an ion mobility spectrometer.

Accordingly, the present invention also provides a method of ion mobility spectrometry comprising: analysing a reference compound in a first ion mobility spectrometer and outputting ion mobility spectral data in response thereto; analysing the reference compound in a second, different ion mobility spectrometer and outputting ion mobility spectral data in response thereto; and adjusting at least one of an operational parameter, duty cycle, or acquired spectral data of one or both of the spectrometers such that, for the same consumption of the reference compound by the spectrometers, the statistical precision of quantification and/or the statistical precision of ion mobility measurement of the spectral data output by the first spectrometer for the reference compound is substantially the same as for the spectral data output by the second spectrometer.

Corresponding features to those described herein in relation to mass spectrometry may be used in the method of ion mobility spectrometry, except wherein when such features refer to mass they will relate to ion mobility. For example, for features that refer to mass spectral data, the corresponding features will refer to ion mobility spectral data. Similarly, for features that refer to mass resolution or mass peaks, the corresponding features will refer to ion mobility resolution or ion mobility peaks.

The present invention also provides a system configured to perform the above described method, comprising: a first ion mobility spectrometer; a second ion mobility spectrometer; and control circuitry configured to: control each of the first and second ion mobility spectrometers so as to each analyse a reference compound and output ion mobility spectral data in response thereto; and adjust at least one of an operational parameter, duty cycle, or acquired spectral data of one or both of the spectrometers such that, for the same consumption of the reference compound by the spectrometers, the statistical precision of quantification and/or the statistical precision of ion mobility measurement of the spectral data output by the first spectrometer for the reference compound is substantially the same as for the spectral data output by the second spectrometer.

Embodiments of the present invention provide a method of mass spectrometry comprising: providing a means to automatically adjust an instrument parameter, instrument duty cycle or output data, such that, for a given consumption of an analyte, the statistical precision of quantification and mass measurement for two or more mass spectrometers is set to be substantially the same.

The present invention also provides a method of mass spectrometry comprising: performing MS/MS analysis on a compound in a first mass spectrometer, comprising supplying precursor ions from the compound to a first fragmentation or reaction region and fragmenting or reacting the precursor ions therein so as to form product ions; performing MS/MS analysis on said compound in a second, different mass spectrometer, comprising supplying precursor ions from said compound to a second fragmentation or reaction region and fragmenting or reacting the precursor ions therein so as to form product ions; and controlling fragmentation or reaction conditions in the first and second fragmentation or reaction regions such that the ratio of the number of precursor ions to product ions detected by the first spectrometer is substantially the same as the ratio of the number of precursor ions to product ions detected by the second spectrometer.

In MS/MS analyses data containing product ions is often compared to library databases in order to identify or confirm the compound from which they are derived. It is therefore important that different spectrometers running the same analysis produce product ions such that the ratio of the precursor ions to product ions is as similar as possible between the different spectrometers.

The compound may be introduced to each spectrometer with the same concentration and flow rate (and optionally over the same duration).

The fragmentation or reaction conditions in the first and/or second fragmentation or reaction region may be varied until the ratio of the number of precursor ions to product ions detected by the first spectrometer is substantially the same as the ratio of the number of precursor ions to product ions detected by the first spectrometer. These settings may then be used for subsequent analyses.

The fragmentation or reaction conditions that are controlled (e.g. by comprising varying them) may be the energy with which the precursor ions are fragmented (e.g. in a CID collision region), or the time that precursor ions interact with reagent ions.

By way of example, in spectrometers that fragment precursor ions to produce product ions via Collisionally Induced Dissociation (CID), the collision energy that is required to produce a given ratio of precursor ions to product ion may depend on: the gas pressure and gas composition in the CID cell, the absolute voltages produced by the electronics to collide the ions with the gas, and the energy imparted to the ions prior to reaching the collision cell (e.g. by upstream heating). However, the number density of the gas within the collision cell may vary between spectrometers, e.g. depending on how well sealed the gas cell is mechanically, the calibration of the mass flow controller and the purity of the collision gas. The value of one or more of these parameters in one or both spectrometers may be varied until the ratio of the number of precursor ions to product ions detected by the first spectrometer is substantially the same as the ratio of the number of precursor ions to product ions detected by the second spectrometer.

The present invention also provides a system configured to perform the above described method, comprising: a first mass spectrometer having a first fragmentation or reaction region; a second mass spectrometer having a second fragmentation or reaction region; and control circuitry configured to: control the first mass spectrometer to perform MS/MS analysis on a compound, including by supplying precursor ions from the compound to the first fragmentation or reaction region and fragmenting or reacting the precursor ions therein so as to form product ions; control the second mass spectrometer to perform MS/MS analysis on said compound, including by supplying precursor ions from the compound to the second fragmentation or reaction region and fragmenting or reacting the precursor ions therein so as to form product ions; and control fragmentation or reaction conditions in the first and second fragmentation or reaction regions such that the ratio of the number of precursor ions to product ions detected by the first spectrometer is substantially the same as the ratio of the number of precursor ions to product ions detected by the second spectrometer The system may be configured (e.g. using control circuitry) to supply the compound to the first and second mass spectrometers at the same concentration and flow rate such that the spectrometers have said same consumption of the compound.

The system may comprise an informatics hub that is connected to the first and second spectrometers by a communications network, such as the internet, so that it can receive data from the spectrometers. The network may be hard-wired or wireless.

The system may have control circuitry that causes the spectrometers to analyse the same compound at a plurality of time intervals and send data representative of the mass spectral data from these analyses to the informatics hub. The informatics hub may have (or be connected to) a processor and circuitry that compares the data from the spectrometers with each other and/or reference data so as to determine if the ratios detected by the spectrometers is substantially the same at the plurality of time intervals. If it is determined that this is not the case, the hub may be configured to send instructions to one of the spectrometers so as to adjust said fragmentation or reaction conditions in one or both of the spectrometers such that the ratios are substantially the same for the spectrometers.

The present invention also provides an ion mobility spectrometer configured to generate ion mobility spectral data and to transmit data representative of the ion mobility spectral data to a remote informatics hub, e.g. of the type described herein.

The present invention also provides an informatics hub configured to receive, over a network, data representative of ion mobility spectral data from different ion mobility spectrometers (optionally at a plurality of different time intervals) and to compare the data from the spectrometers with each other and/or to reference data so as to determine if said ratios are substantially the same (optionally at the plurality of time intervals).

If it is determined that the ratios are not the same, the hub may be configured to send instructions to one or more of the spectrometers so as to adjust the fragmentation or reaction conditions in one or more of the spectrometers such that the ratios are the same. The present invention also provides a computer program comprising instructions which, when the program is executed by the first and second ion mobility spectrometers (or one or more computer controlling the spectrometers), causes the spectrometers to perform the method of ion mobility spectrometry described herein.

BRIEF DESCRIPTION OF THE DRAWINGS

Various embodiments of the present invention will now be described, by way of example only, and with reference to the accompanying drawings in which.

DETAILED DESCRIPTION

Figures 1, 2A, 2B:
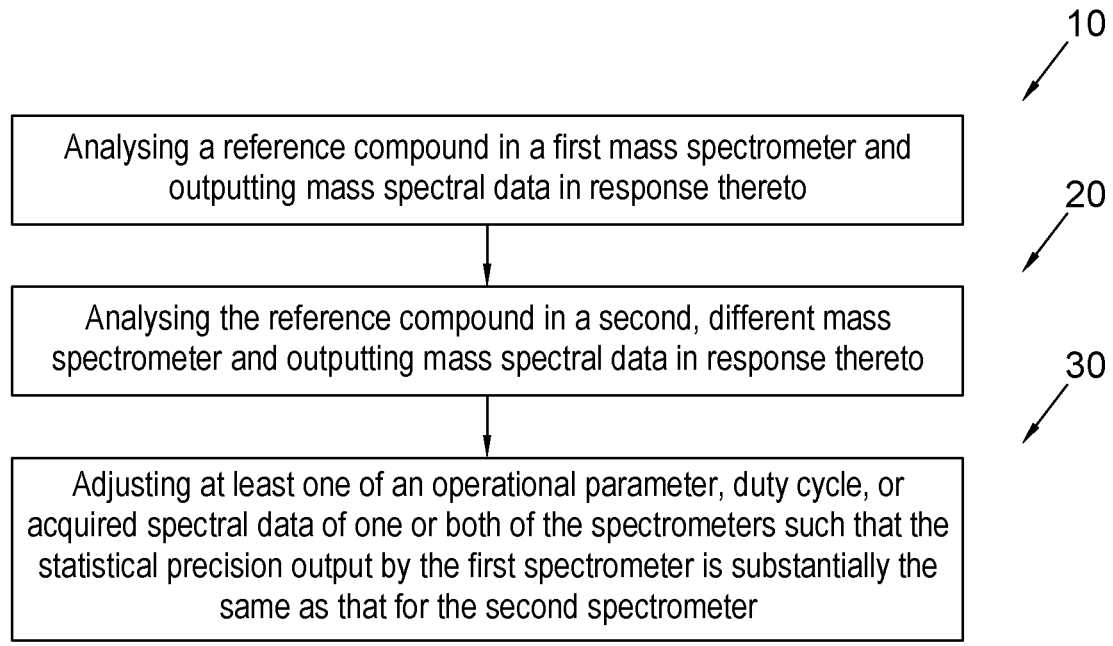
FIG. 1 shows a flow chart of the method steps in an embodiment for standardising the statistical precision of multiple different mass spectrometers.
FIGS. 2A-2B show the performances of different mass spectrometers before and after standardisation.

Referring to FIG. 1, embodiments of the present invention comprise: a step 10 of analysing a reference compound in a first mass spectrometer and outputting mass spectral data in response thereto; a step 20 of analysing the reference compound in a second, different mass spectrometer and outputting mass spectral data in response thereto; and a step 30 of automatically adjusting an operational parameter, duty cycle (e.g. duty cycle of data acquisition), or acquired spectral data of at least one mass spectrometer such that, for a given consumption of reference compound by the spectrometer, the statistical precision of quantification and/or mass measurement by the mass spectrometer is substantially the same as that of another mass spectrometer (for the same given consumption of the analyte).

The operational parameter, duty cycle, or output data of each of two or more spectrometers may be adjusted such that (for a given consumption of an analyte by the spectrometers) their statistical precision of quantification and mass measurement are substantially the same. The at least one spectrometer may therefore be specifically tuned or operated such that spectrometers of the same design have substantially the same performance and therefore have produce data with substantially the same quantitative and qualitative performance.

By way of example, it is well known that the precision of measurements obtained by analytical equipment utilizing destructive ion detectors (e.g. electron multipliers, photomultipliers, Faraday detectors etc.) such as Time of Flight mass analysers, quadrupole mass filter mass analysers and ion mobility separator analysers, is governed by ion statistical relationships. In the simplest case, the quantitative precision is related directly to the number of ion events recorded at the detector per unit time. The standard deviation $\sigma_{QUAN}$ in the number of recorded ions (e.g. signal intensity or peak area) is related to the number of ions N recorded for a given consumption of compound as follows:

$$\sigma_{QUAN} = \frac{1}{\sqrt{N}} \quad (1)$$

For simple ion counting systems, such as for example where each ion arrival is recorded with a count of one, the number of ions recorded for a given consumption of a reference compound may be calculated directly from the area of the resultant detected signal peak. The statistical precision may then be calculated using equation 1 above. However, for systems using analog-to-digital data recording electronics, the gain of the detector, the downstream amplification and the effect of the electron multiplier pulse height distribution and digitization system need to be considered. It is common practice to determine the overall average response for a single ion during the instrument setup. This value may then be used to estimate the number of ions N recorded for a given consumption of compound and hence to estimate the expected statistical precision of the instrument. From equation 1 above it is apparent that to normalize the quantitative precision of the instruments an estimate of the number of ion arrivals recorded must be determined and controlled.

The precision of a peak measurement, such as a mass measurement or ion mobility drift time measurement for example, is governed by the number of ions recorded and the peak width or resolution. By way of example, for a time of flight mass spectrometer with a resolution defined at FWHM, the precision of the mass measurement is given by equation 2 below.

$$\sigma_{Mass} = \frac{1}{R_{Mass}\sqrt{5.5N}} \qquad (2)$$

Where $$R_{Mass} = \frac{M}{\Delta M(FWHM)},$$

and N is the number of ions recorded for a given consumption of compound.

From equation 2 it can be seen that to normalize the mass measurement precision both the number of ion arrivals and the resolution or peak width must be controlled.

Embodiments of the invention comprise introducing a reference material (or materials) into the spectrometer at a known concentration and rate of introduction to produce a response at the detector in one or more modes of operation. This may be performed by an infusion of a sample at a known concentration and/or rate, or as part of a chromatographic separation. One or more operational parameter of the spectrometer may then be automatically adjusted so as to set the response of the spectrometer (to the detection of the reference material) so as to have one or more predetermined target criterion/value. This automatic adjustment may be achieved by: analysing spectral data obtained by the spectrometer whilst varying said one or more operational parameter; determining the one or more operational parameter that provides the spectral data with the one or more predetermined target criterion/value; and then setting the spectrometer to use the determined one or more operational parameter in future analyses. The automatic adjustment may therefore use a feedback mechanism to determine the one or more operational parameter that should be used to analyse samples. This method may then be repeated on one or more other spectrometer (e.g. of the same design/type), using the same predetermined target response criterion/value, such that the responses of the spectrometers (to the same reference material) are substantially the same.

Depending on the application, different approaches to normalizing multiple spectrometers are envisaged.

In a first approach, a minimum specification for the precision of measurement for a given consumption of a reference compound is set. This minimum specification may be set by the manufacturer or may be set based on the specific requirements of an analysis. This minimum specification may include a minimum resolution and/or a minimum quantitative precision. It is assumed that the gain of the detector (e.g. the average detector output signal for a single ion arrival) is set to be substantially the same for all of the spectrometers. It is also assumed that the spectrometers are set-up and tuned in a substantially identical manner, e.g. according to the manufacturer's instructions. The same reference compound having the same concentration is then analyzed, under the same analysis conditions, on each spectrometer. Each spectrometer is then automatically adjusted in response to this until the performance substantially matches the predetermined target response value, e.g. using the technique described above. If an instrument initially exceeds the target response value, the instrument is adjusted to a lower performance so as to match the target response value. If it is not possible for the instrument to reach the predetermined target value then this instrument may be deemed to be unfit for the analysis and it may be indicated that maintenance may be required on that instrument.

In a second approach, the predetermined target value is selected to be the performance of one of the spectrometers prior to performing the step of adjusting the performance. For example, the same reference compound having the same concentration may be analyzed under the same analysis conditions on each of the spectrometers. The performances of the spectrometers may then be determined and the predetermined target value may be selected to be one of the performances of one of the spectrometers, such as the performance of the spectrometer having the lowest performance. The performance of each of the other spectrometers (not having the predetermined target value) may then be adjusted such that all of these spectrometers have substantially the same performance as the target value when they analyse the reference compound (and/or another reference compound).

Care must be taken when using this second approach to ensure that the adjustment of the spectrometers does not lead to them being adjusted to a performance level at which they no longer have the performance required for the analysis that is desired to be conducted. A lower performance threshold may be set, e.g. based on the analysis that is desired to be detected, and the selected predetermined target value must be a performance above the threshold target value (such as the performance of the instrument above, but closest to the threshold value). As described above, the performance of the spectrometers prior to performing the step of adjusting the performance may be determined in order to select the predetermined target value. If the performance of any of the spectrometers is below the threshold value then these performances are not used as the target value and these spectrometers may not be used for the subsequent analysis of samples. It may be indicated that these poorly performing spectrometers require maintenance. The performance of the lowest performing spectrometer that is above the threshold value may be used as the target value for adjusting the performance of the other spectrometers.

FIGS. 2A-2B show an example of the second approach. In this example, the same reference compound having the same concentration was analyzed under the same analysis conditions on five spectrometers (#1-5). FIG. 2A shows both the number of ions received at the detector N (per second) and the resolution for each of the five spectrometers. It can be seen that the value of N is different for all of the spectrometers and the resolution is also different for all of the spectrometers. Spectrometer 4 has the lowest value of N, but it is determined that this value is below the performance threshold required for performing subsequent analyses and so spectrometer 4 is not used in further analyses. Spectrometer 3 is determined to have the lowest value of N that is above the performance threshold. The remaining spectrometers 1, 2 and 5 are then adjusted such that all of these spectrometers have substantially the same value of N and the same resolution as spectrometer 3, as is shown in FIG. 2B. Spectrometer 4 is not adjusted. Although this example uses five spectrometers, any number of multiple spectrometers may be used.

To achieve the above-described normalisation/standardisation of spectrometers, automatically across different spectrometers at different locations, information from the spectrometers may be compared and may be exchanged between individual spectrometers.

Figure 3:
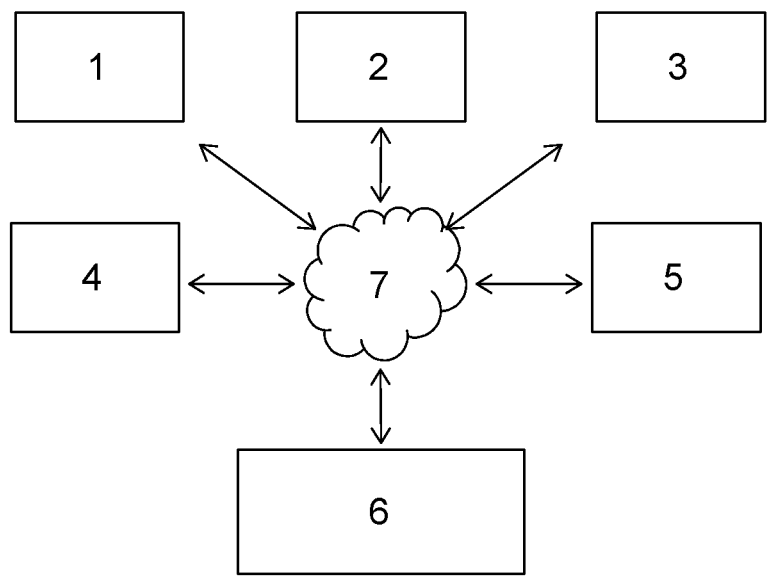
FIG. 3 shows a schematic of a networked system that may be used to perform the method of FIG. 1.

FIG. 3 shows a schematic of an embodiment in which each spectrometer 1-5 may be connected (e.g. digitally connected) to a central informatics hub 6 which can examine metrics generated from the data acquired by the spectrometers 1-5 and determine the action that is required to normalize/standardize the performance of the spectrometers. The hub 6 may monitor this qualitative and/or quantitative performance continuously or at intervals such as periodic intervals. The hub 6 may also determine which of the spectrometers 1-5 require maintenance, e.g. by determining that its performance is below a threshold level. The spectrometers may be connected to the hub 6 via the internet or another network 7.

The spectrometers 1-5 may analyse the same quality control reference compounds at intervals, such as regular intervals. This can include analyzing a known reference compound or a mixture of known reference compounds at periodic or non-regular intervals. It is envisaged that data from the analyses of these quality control reference compounds (i.e. the responses of the spectrometers) may be monitored and compared to ensure that the spectrometers are performing in substantially the same way (at least for those reference compounds), optionally within a preset tolerance. For example, the mass resolution and response of each spectrometer may be monitored by examining the average resolution recorded for any analyte run or for an internal or external mass measurement reference (e.g. lock mass ions). One or more metric such as these may be monitored for the spectrometers and may be compared (e.g. in a central informatics hub 7). This can be used to provide trending information on how the performance of any one, or all, of the spectrometers may change with time. This may be used to ensure that (unacceptable) losses in performance of an individual spectrometer can be anticipated from the trend, e.g. during a long analytical sequence/run. The loss of performance may then be rectified. For example, the performance of one or more spectrometer having a loss of performance may be dynamically adjusted in response to the detection of a loss of performance so as to ensure that the spectrometers remain normalised/standardised with each other.

There are several methods by which the performance of a spectrometer may be altered, some of which are described below. Different methods may be preferred for different types of spectrometer and/or for the type of analysis desired to be performed. For example, in a targeted analysis where it is desired to analyse predetermined target ions, only the performance of the spectrometer in respect of the target analysis may be of concern. As such, the performance of the spectrometer for analyzing the target ion(s) may be the performance that is normalized/standardized across the spectrometers. The performance of the spectrometers for analyzing non-target species may not be normalized across the spectrometers. In contrast, in a non-targeted analysis the performance of the spectrometer in respect of a range of mass to charge ratios and/or ion motilities may be of concern. As such, the performance of the spectrometer for analyzing these ranges of ions may be the performance that is normalized/standardized across the spectrometers.

The performance criterion or criteria of the spectrometers that is desired to be normalized/standardized across the spectrometers may be one or more of: the resolution, quantitative precision, product ion production efficiency, ion detection efficiency, precision in a post-processing step (e.g. on the spectral data detected), and duty cycle of data acquisition, or another criterion. As such, it is necessary to be able to adjust the value of the performance criteria for the spectrometers such that the spectrometers are normalized/standardized for the one or more criteria. Several examples of various criteria and how they may be adjusted are described below.

Embodiments comprise adjusting at least one, some, or all of the spectrometers so that the spectrometers have the same resolution for the reference compound(s). This adjusting may be performed by changing one or more operational parameter of the spectrometer. For example, for an orthogonal time of flight mass spectrometer the resolution may be altered by altering the ion entrance conditions (e.g. velocity and positional spread of the ions) as ions enter the orthogonal acceleration region. Alternatively, the spatial focusing condition of the ions at the detector may be altered by adjusting low and high voltage elements of the time of flight analyser. As another example, the resolution of a quadrupole mass filter may be adjusted by altering the voltages applied to the mass filter, e.g. by altering the ratio of the DC to RF voltages applied to the quadrupole electrodes of the mass filter.

Another example of adjusting the resolution of a spectrometer is to modify the acquired data during post-processing of the data. For example, if full spectral data is acquired, data at a higher resolution than the target value may be distorted in a post-processing step so as to artificially lower the resolution to the target value. This may be done using a simple FIR filter, matched to the desired resolution. Alternatively, this may be done by more sophisticated methods which consider the statistical nature of the data. For example, for a given mass peak in the spectral data, the method may first estimate a central ion arrival time (e.g. m/z, where time and m/z are correlated, such as in a TOF MS) and the number of ions N that formed the peak. The method may subsequently take M (where $M \leq N$) random arrival time (mass) samples from an ion arrival distribution having a width chosen to produce the target width (e.g. representing the target resolution). These ion arrivals may be combined together to form a peak of approximately the target width. Optionally, the central ion arrival time of the resulting peak may be shifted to match that of the original peak. The ion arrival distribution chosen may be any suitable peak shape, for example Gaussian, Cauchy, Pearson IV etc. The number M may be chosen to produce a simulated sensitivity or statistical precision that is similar to or less than the original data. The method may involve an optional intermediate step. If the number of pushes P (e.g. of an orthogonal accelerator in a TOF MS) used to form the original spectrum is known, the method may calculate an ion arrival rate per push as $\lambda = M/P$. For each push p (where $1 \leq p \leq P$), the method may take a sample number of ions m(p) from a Poisson distribution with mean $\lambda$. The method may then take m(p) samples from the chosen ion arrival distribution and combine them to form a spectrum for each push. Any required additional timing jitter may be added to the P individual spectra before they are combined together to form the final peak.

Another example of adjusting the resolution in a spectrometer that analyses ions based on their time of detection is to perturb the detection times of the ions so as to reduce the resolution of the spectrometer. For example, for a time of flight mass analyser, such as an orthogonal time of flight mass analyser, the mass resolution may be altered by adding timing jitter into the detection system (e.g. when used in targeted analysis, where a single species is considered). The timing jitter may be added, for example, by altering the discriminator level used to trigger the start of each time of flight transient with time, e.g. at high frequency.

Embodiments comprise adjusting at least one, some, or all of the spectrometers so that the spectrometers have the same quantitative precision for the reference compound(s). This adjusting may be performed by adjusting the ionization efficiency of the spectrometer. The method of adjusting the ionization efficiency may vary depending on the ionization method that the spectrometer uses. For example, if the spectrometer uses an electron impact ion source then the filament current or emission may be varied so as to alter the ionization efficiency. If the spectrometer uses an electrospray ion source, one or more of the emitter voltage, gas flow(s) and temperature may be altered so as to vary the ionization efficiency. If the spectrometer uses an APPI source, the lamp current/emission may be altered so as to vary the ionization efficiency. If the spectrometer uses an APCI source, the corona discharge voltage may be altered so as to vary the ionization efficiency.

Another example of adjusting the quantitative precision of a spectrometer is to adjust the ion transmission into and/or through the spectrometer. The transmission efficiency of ions from an ion source (e.g. atmospheric ion source) into a vacuum chamber of the spectrometer may be varied to adjust the quantitative precision of the spectrometer. Additionally, or alternatively, the transmission efficiency of ions within a vacuum chamber, or between vacuum chambers, of the spectrometer may be varied to adjust the quantitative precision of the spectrometer.

It is contemplated that the quantitative precision of a spectrometer may be adjusted by varying the position of the ion source relative to the sampling orifice (inlet orifice) of the spectrometer. For example, the position of the ion source nebulizer or emitter (e.g. in an API ion source) may be moved relative to the sampling orifice.

It is contemplated that the quantitative precision of a spectrometer may be adjusted by varying the size of the sampling orifice of the spectrometer.

Other methods of varying the quantitative precision of a spectrometer are contemplated, such as: altering the gas flows or voltages proximate the sampling orifice of the spectrometer; altering one or more voltage applied to electrodes of the spectrometer, such as those of an ion guide (e.g. varying a DC voltage and/or the amplitude and/or frequency of an AC voltage); using a pulsed or de-focusing/deflecting attenuation lens to defocus or deflect ions within the spectrometer; or adjusting the duty cycle with which ions are trapped within the spectrometer.

Embodiments comprise adjusting the measurement precision of at least one, some, or all of the spectrometers so that the spectrometers have the same performance. For example, in a targeted analysis energy may be added to the ions, or reactions allowed to occur with the ions, to cause dissociation or reaction of the ions (e.g. via proton transfer). This has the effect of changing the number of precursor and product ions. The number of product ions produced may be increased or decreased depending on the product ion being monitored and the energy or reaction time. The energy or reaction time can therefore be varied so as to adjust the total number of ions which reach the detector for a target. This technique can therefore be used to ensure the measurement precision is the same for each spectrometer.

Embodiments comprise adjusting the efficiency of ion detection of at least one, some, or all of the spectrometers so that the spectrometers have the same performance. For example, ion detection, using an electron multiplier, consists of a primary ion strike which releases a first number of electrons (primary electron yield) followed but a successive release of further electrons caused by the impact of these released electrons. The primary electron yield determines the efficiency of ion detection. For example, in most time of flight mass spectrometers the primary yield is set to be >1 such that most (or all) of the ions striking the detector result in at least one electron being released. If the yield is lower than 1 some of the ions which reach the detector do not give rise to any secondary electrons and so are not recorded. The subsequent electron to electron conversion does not affect this detection efficiency regardless of how much electron amplification is generated. For time of flight and quadrupole mass spectrometers the primary electron yield is increased above 1 by accelerating ions into a dynode surface with a high voltage (e.g. multiple keV). By reducing the primary electron yield below 1 electron per ion strike, the efficiency of ion detection may be reduced such that only a subset of ion arrivals are converted to primary electrons and thus the quantitative precision of the spectrometer for a given consumption of sample may be altered.

Embodiments comprise adjusting the precision in a post-processing step of at least one, some, or all of the spectrometers so that the spectrometers have the same performance. For example, intensity variance may be introduced into the data in a post-processing step such that the data produced by the different spectrometers appears to have the same statistical precision. Once the absolute performance of each spectrometer is known from analysing a reference compound or compounds, the relative performance of all the spectrometers can be determined. For spectrometers that are determined to perform to a higher level than the target value, a variation (such as Poisson noise) may be added into the spectral data in a post-processing step. This technique may be used to ensure that the data from the different spectrometers has the same statistical precision.

Embodiments comprise adjusting the duty cycle of data acquisition for at least one, some, or all of the spectrometers so that the spectrometers have the same performance. The duty cycle of data acquisition may be defined as the ratio of the time during an experiment over which data is acquired (said data subsequently being recorded) to the sum of this time plus the time during the experiment over which data is either not acquired or is acquired but discarded (e.g. not recorded). This ratio may be multiplied by 100 so as to be expressed as a percentage. This duty cycle may be varied by varying the time during the experiment over which data is acquired (said data subsequently being recorded).

By way of example, the mass separation in an orthogonal acceleration TOF mass spectrometer generally takes tens of microseconds. Data from multiple individual TOF transients are summed to produce a mass spectrum which is saved to disk on much slower timescales, e.g. that are compatible with chromatography. By way of example, for a TOF spectrometer having a 10 kHz orthogonal sampling frequency and a 100 ms acquisition time, one thousand individual TOF spectra will be summed. An interscan delay of, say, 5 ms is provided between summed spectra, during which no TOF data is recorded, which allows data transfer and settling time after any system parameters are altered. The duty cycle for data acquisition in this example 100/105=95%. In order to reduce the number of ions recorded in the 100 ms cycle time, fewer ToF transients may be summed. Data from transients that are not summed may simply be discarded. This has the effect of reducing the statistical precision of the system by reducing the number of ion event recorded for the consumption by the spectrometer of a given amount of sample.

Therefore, the data acquisition duty cycle of a spectrometer may be varied by varying the time (or number of TOF transients) over which data is summed and the time over which the data is discarded. The performance of the spectrometers may be normalized/standardised by adjusting the data acquisition duty cycle of the spectrometers. This is simple to implement, deterministic and independent of ion mass to charge ratio, and can be adjusted dynamically based on the assessment of the performance of each spectrometer.

For the example given above, to reduce the number of ions recorded by a factor of two, transients would be summed and recorded for 50 ms and discarded for 55 ms giving a duty cycle of 48%. This would reduce the quantitative precision of each measurement by 1.4 (i.e. $\sqrt{2}$).

The duty cycle of data acquisition may be varied in other types of spectrometer such as a quadrupole mass filter spectrometer operating in a targeted mode of operation. In such a spectrometer the quadrupole mass filter has a mass transmission window that is repeatedly changed with time and the ion signal detected is usually acquired/integrated for a fixed dwell time. An inter-scan delay time is also provided during which no data is summed to allow the quadrupole mass filter mass transmission window to change and settle. To reduce the amount of ion arrivals recorded and hence reduce the performance of the spectrometer, the duty cycle may again be changed. For example, for a 5 ms dwell time and a 1 ms inter-scan delay, the data acquisition duty cycle is 83%. However, if the period of data integration is changed so as to occur over only 2.5 ms of the 5 ms dwell time, the number of ions recorded drops by a factor of two and the duty cycle for data recording is 42%.

In both of the TOF and quadrupole mass spectrometers described above, the total cycle time may remain the same whilst the duty cycle of data acquisition is varied by changing the duration over which data is acquired (and subsequently recorded).

It should also be noted that embodiments that reduce the performance of some (or all) of the spectrometers in order to normalise their responses may provide a longer overall operation lifetime for those spectrometers before maintenance. This is because these spectrometers will not be used at the maximum performance achievable. As these spectrometers are used their performance may decrease below the target value. The spectrometers can then be adjusted so that their performance is increased to maintain the target value.

Although embodiments of the invention have been described mainly in terms of mass spectrometers, it is also applicable to mobility spectrometers, ion mobility separation devices or filtering devices.

Figure 4:
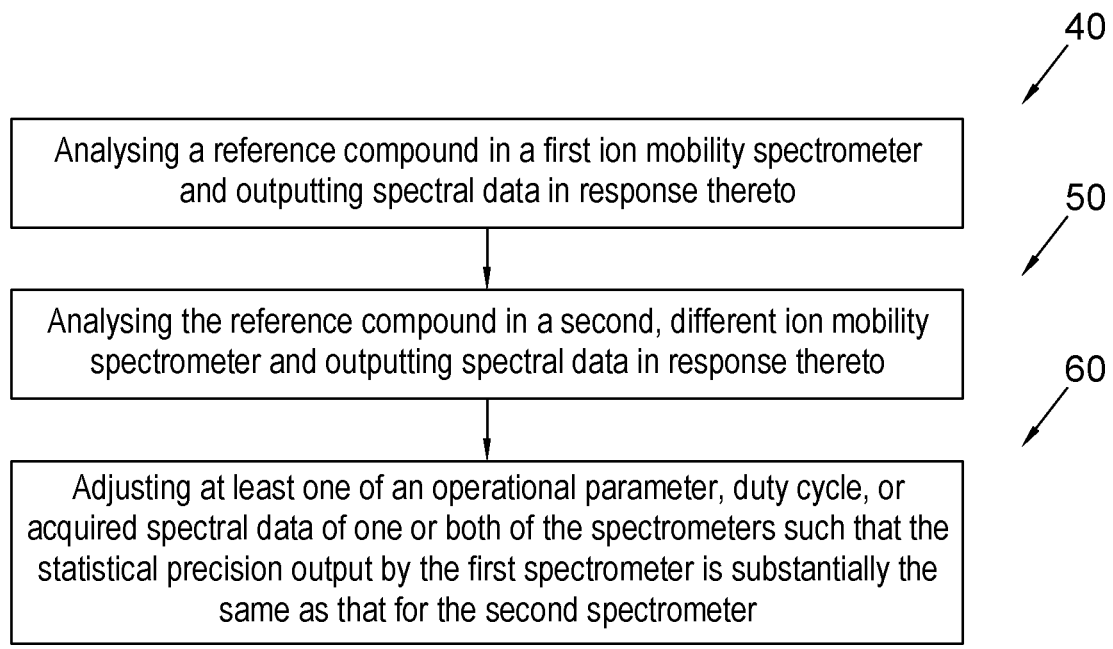
FIG. 4 shows a flow chart of the method steps in an embodiment for standardising the statistical precision of multiple different ion mobility spectrometers.

FIG. 4 shows an embodiment of the present invention comprising: a step 40 of analysing a reference compound in a first ion mobility spectrometer and outputting ion mobility spectral data in response thereto; a step 50 of analysing the reference compound in a second, different ion mobility spectrometer and outputting ion mobility spectral data in response thereto; and a step 60 of adjusting at least one of an operational parameter, duty cycle (e.g. duty cycle of data acquisition), or acquired spectral data of one or both of the spectrometers such that, for the same consumption of the reference compound by the spectrometers, the statistical precision of quantification and/or the statistical precision of ion mobility measurement of the spectral data output by the first spectrometer for the reference compound is substantially the same as for the spectral data output by the second spectrometer.

According to a second aspect, embodiments provide a method of controlling the collision energy or reaction time of precursor ions in MS/MS analyses within different spectrometers, such that when the same compound is analysed by MS/MS in the different spectrometers the ratio of the number of precursor ions to product ions is substantially the same.

Figure 5:
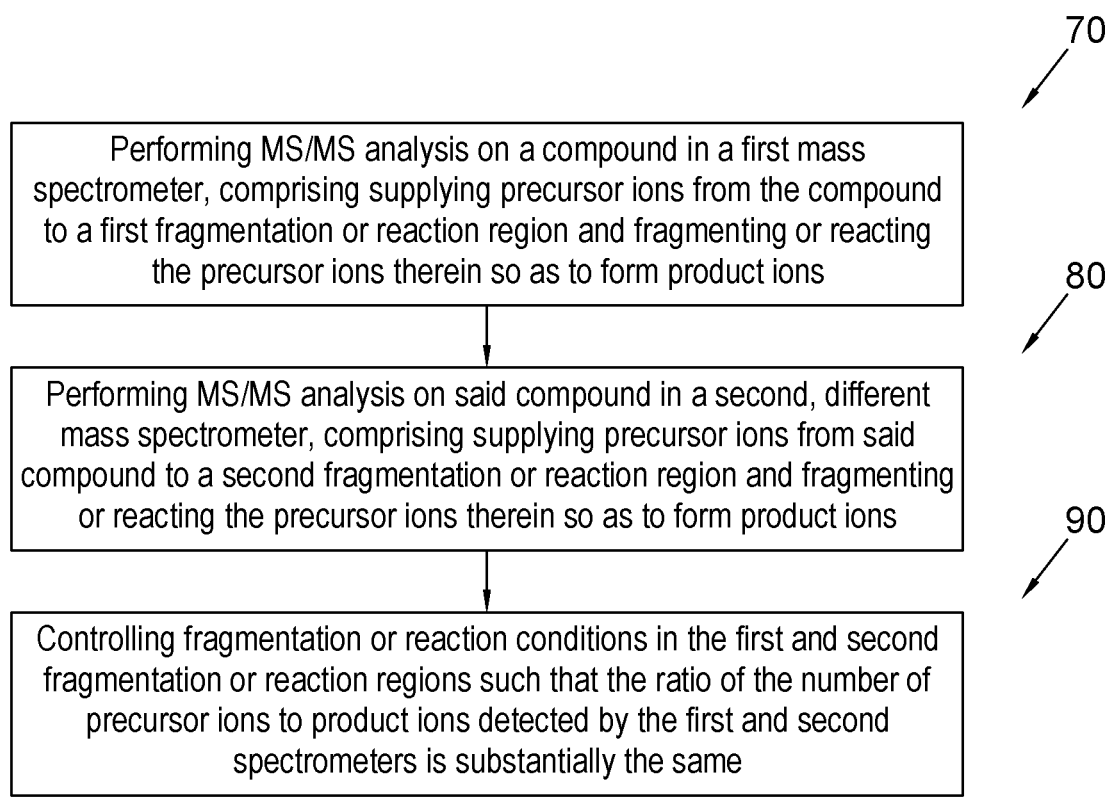
FIG. 5 shows a flow chart of the method steps in an embodiment for standardising the ratio of precursor ions to product ions in multiple different mass spectrometers performing MS/MS analyses.

FIG. 5 shows an embodiment of such a method comprising: a step 70 of performing MS/MS analysis on a compound in a first mass spectrometer, comprising supplying precursor ions from the compound to a first fragmentation or reaction region and fragmenting or reacting the precursor ions therein so as to form product ions; a step 80 of performing MS/MS analysis on said compound in a second, different mass spectrometer, comprising supplying precursor ions from said compound to a second fragmentation or reaction region and fragmenting or reacting the precursor ions therein so as to form product ions; and a step 90 of controlling fragmentation or reaction conditions in the first and second fragmentation or reaction regions such that the ratio of the number of precursor ions to product ions detected by the first spectrometer is substantially the same as the ratio of the number of precursor ions to product ions detected by the second spectrometer.

In data dependent acquisitions and data independent acquisitions (such as MSe), MS/MS or high energy data containing product ions is often compared to library databases in order to identify or confirm the compound from which they are derived. It is therefore important that different spectrometers running the same analysis produce product ions such that the ratio of the precursor ions to product ions is as similar as possible between the different spectrometers.

For example, in spectrometers that dissociate precursor ions to produce product ions via Collisionally Induced Dissociation (CID), the collision energy that is required to produce a given ratio of precursor ions to product ion may depend on: the gas pressure and gas composition in the CID cell, the absolute voltages produced by the electronics to collide the ions with the gas, and the energy imparted to the ions prior to reaching the collision cell (e.g. by upstream heating). However, the number density of the gas within the collision cell may vary between spectrometers, e.g. depending on how well sealed the gas cell is mechanically, the calibration of the mass flow controller and the purity of the collision gas.

In a corresponding way to the normalization/standardization techniques described above, precursor ions of a reference compound (or compounds) may be dissociated or reacted to produce product ions, and the dissociation or reaction conditions (e.g. collision energy) may be varied until the dissociation or reaction conditions provide a target ratio of precursor ions to product ion for each spectrometer. This will yield dissociation or reaction conditions which will be slightly different for each spectrometer. These values can then be used subsequent DDA or DIA analyses by the spectrometers, e.g. such that the high energy data is substantially the same.

For targeted analysis using a tandem quadrupole mass spectrometer, the optimum collision energy required to produce the desired proportion of product ions for each target analyte may be determined on a first mass spectrometer by using reference standards. One of the reference standards may then be analysed by a second spectrometer, and the collision energy in the second spectrometer may be varied until the spectrum that is obtained is substantially the same as that obtained by the first spectrometer, for that reference standard. The ratio of the optimum collision energy in the first spectrometer for said one of the reference standards to the collision energy in the second spectrometer that provides substantially the same spectrum may then be determined. The optimum collision energy in the first mass spectrometer for each of the different reference standards (i.e. for each target ion) may then be scaled by said ratio in order to determine the collision energies to be used in the second mass spectrometer for analyzing the respective target ions. For example, if it is determined that the first mass spectrometer requires a collision energy of 10 eV to produce a similar spectrum for a reference compound as a second spectrometer operating at a collision energy of 15 eV, then the different optimum collision energies used by the first spectrometer for the different reference compounds (i.e. for the different target ions) are scaled by the ratio 15/10 and applied in the second spectrometer when analyzing corresponding target ions. This enables the performance of the first and second spectrometers to be normalised/standardised.

Although the present invention has been described with reference to preferred embodiments, it will be understood by those skilled in the art that various changes in form and detail may be made without departing from the scope of the invention as set forth in the accompanying claims.

For example, although embodiments of the invention have been described mainly in terms of employing destructive ion detection, it should be noted that it is also advantageous to perform the such normalization/standardisation for other types of spectrometers, including those using inductive ion detection systems.

The invention claimed is:

1. A method of mass spectrometry comprising:
analysing a reference compound in a first mass spectrometer and outputting mass spectral data in response thereto;
analysing the reference compound in a second, different mass spectrometer and outputting mass spectral data in response thereto; and
adjusting at least one of an operational parameter, duty cycle, or acquired spectral data of one or both of the spectrometers such that, for the same consumption of the reference compound by the spectrometers, the statistical precision of quantification and/or the statistical precision of mass measurement of the spectral data output by the first spectrometer for the reference compound is substantially the same as for the spectral data output by the second spectrometer;
wherein one or both of the spectrometers has a statistical precision of quantification and/or statistical precision of mass measurement that is above a pre-selected desired value when one or both of said spectrometers initially analyse said reference compound; and wherein said step of adjusting is then performed on one or both of said spectrometers until the performance of one or both spectrometers is lowered such that its statistical precision of quantification and/or statistical precision of mass measurement for the reference compound is at said pre-selected desired value.

2. The method of claim 1, wherein said one or both of the spectrometers automatically adjust at least one of said operational parameter, duty cycle, or acquired spectral data so that the statistical precision of quantification and/or the statistical precision of mass measurement of the spectral data output by the first spectrometer for the reference compound is substantially the same as for the spectral data output by the second spectrometer for the reference compound.

3. The method of claim 2, comprising selecting one or more target criteria for spectral data output by the spectrometers, the one or more target criteria being representative of the desired statistical precision of quantification and/or the statistical precision of mass measurement of the spectral data output by the spectrometers for the reference compound;
performing said step of adjusting at least one of an operational parameter, duty cycle, or acquired spectral data of one or both of the spectrometers until said one or both spectrometers is configured with settings such that they output spectral data having substantially said one or more target criteria; and
setting said one or more spectrometers to operate with said settings when subsequently analysing further analytical samples.

4. The method of claim 1, comprising determining that one of the spectrometers is not able to provide said pre-selected desired value of statistical precision of quantification and/or statistical precision of mass measurement by adjusting said at least one of an operational parameter, duty cycle, or acquired spectral data of the spectrometers; and in response thereto, determining and/or indicating that this spectrometer should not be used for the subsequent analysis of samples and/or that the spectrometer requires maintenance.

5. The method of claim 1, comprising selecting said desired statistical precision of quantification and/or the statistical precision of mass measurement for the reference compound as the statistical precision of quantification and/or the statistical precision of mass measurement of one of the spectrometers; and then adjusting at least one of an operational parameter, duty cycle, or acquired spectral data of the other spectrometer until said other spectrometer substantially has said desired statistical precision of quantification and/or the statistical precision of mass measurement for the reference compound.

6. The method of claim 5, comprising selecting a minimum performance threshold for the statistical precision of quantification and/or the statistical precision of mass measurement of the spectrometers; wherein said step of selecting the desired statistical precision of one of the spectrometers comprises selecting a statistical precision of quantification and/or the statistical precision of mass measurement that is at or above said minimum performance threshold.

7. The method of claim 1, wherein at least one of the spectrometers analyses the same reference compound at a plurality of time intervals and the mass spectral data from these analyses are compared to each other and/or to reference spectral data so as to determine if the statistical precision of the spectral data output by that spectrometer changes with time; and when it is determined that there is a change in the statistical precision of the spectrometer, the method comprises adjusting said at least one of an operational parameter, duty cycle, or acquired spectral data of that spectrometer so as to change the statistical precision of spectral data output by that spectrometer.

8. The method of claim 1, wherein the spectrometers analyse the same reference compound at a plurality of time intervals and the mass spectral data from these analyses are compared to each other and/or to reference spectral data so as to determine if the statistical precisions of the different spectrometers are substantially the same at each of the plurality of time intervals; and when it is determined that the statistical precisions are not the same, the method comprises adjusting said at least one of an operational parameter, duty cycle, or acquired spectral data of at least one of the spectrometers so that they have the same statistical precision.

9. The method of claim 1, comprising controlling the number of ions of the reference compound arriving at an ion detector of the first spectrometer to be substantially the same as the number of ions of the reference compound arriving at an ion detector of the second spectrometer, for said given consumption of the reference compound, so that the spectrometers have substantially the same quantitative precision.

10. The method of claim 1, comprising adjusting the mass resolution of at least one of the spectrometers so that the spectrometers have the same mass resolution, for said reference compound; and/or
comprising adjusting the spectral data acquired by at least one of the spectrometers, in a post-processing step, so that the data output from the spectrometers has the same mass resolution, for said reference compound.

11. The method of claim 10, wherein said step of adjusting the mass resolution comprises:
(i) adjusting mass to charge ratios of the ions detected by said at least one of the spectrometers so as to provide data at a lower resolution; or
(ii) perturbing detection times of ions detected by said at least one of the spectrometers so as to provide data at a lower resolution, wherein the spectrometers mass analyse ions based on their time of detection.

12. The method of claim 10, wherein the spectral data is adjusted in the post-processing step by filtering the spectral data so as to provide data at a lower resolution.

13. The method of claim 1, comprising adding noise, such as ion signal intensity variance, to the spectral data acquired by at least one of the spectrometers, in a post-processing step, so that the spectrometers have the same statistical precision of quantification.

14. The method of any claim 1, comprising adjusting the duty cycle of data acquisition in one or both of the spectrometers so that the spectrometers have substantially the same statistical precision of quantification and/or mass measurement.

15. The method of claim 1, comprising adjusting one or more of the following, in one or both of the spectrometers, so that the spectrometers have substantially the same statistical precision of quantification and/or mass measurement:
(i) the ionisation efficiency of an ion source in one or both of the spectrometers; and/or
(ii) the ion transmission through one or both of the spectrometers; and/or
(iii) the ion detection efficiency of a detector system in one or both of the spectrometers.

16. A system configured to perform the method of claim 1, comprising:
a first mass spectrometer;
a second mass spectrometer; and
control circuitry configured to:
control each of the first and second mass spectrometers so as to each mass analyse a reference compound and output mass spectral data in response thereto; and
adjust at least one of an operational parameter, duty cycle, or acquired spectral data of one or both of the spectrometers such that, for the same consumption of the reference compound by the spectrometers, the statistical precision of quantification and/or the statistical precision of mass measurement of the spectral data output by the first spectrometer for the reference compound is substantially the same as for the spectral data output by the second spectrometer;
wherein one or both of the spectrometers has a statistical precision of quantification and/or statistical precision of mass measurement that is above a pre-selected desired value when one or both of said spectrometers initially analyse said reference compound; and wherein said control circuitry is configured to adjust said at least one of an operational parameter, duty cycle, or acquired spectral data of said one or both of the spectrometers until the performance of one or both spectrometers is lowered such that its statistical precision of quantification and/or statistical precision of mass measurement for the reference compound is at said pre-selected desired value.

17. The system of claim 16, further comprising an informatics hub connected to the first and second mass spectrometers by a communications network, the informatics hub configured to receive, over the network, data representative of mass spectral data from the first and second mass spectrometers, and to compare the data from the spectrometers with each other and/or reference data so as to determine if the statistical precision of the spectral data output by the first and second spectrometers is substantially the same.

18. A method of ion mobility spectrometry comprising:
analysing a reference compound in a first ion mobility spectrometer and outputting ion mobility spectral data in response thereto;
analysing the reference compound in a second, different ion mobility spectrometer and outputting ion mobility spectral data in response thereto; and
adjusting at least one of an operational parameter, duty cycle, or acquired spectral data of one or both of the spectrometers such that, for the same consumption of the reference compound by the spectrometers, the statistical precision of quantification and/or the statistical precision of ion mobility measurement of the spectral data output by the first spectrometer for the reference compound is substantially the same as for the spectral data output by the second spectrometer
wherein one or both of the spectrometers has a statistical precision of quantification and/or statistical precision of ion mobility measurement that is above a pre-selected desired value when one or both of said spectrometers initially analyse said reference compound; and wherein said step of adjusting is then performed on one or both of said spectrometers until the performance of one or both spectrometers is lowered such that its statistical precision of quantification and/or statistical precision of ion mobility measurement for the reference compound is at said pre-selected desired value.

19. A system configured to perform the method of claim 18, comprising:
a first ion mobility spectrometer;
a second ion mobility spectrometer; and
control circuitry configured to:

control each of the first and second ion mobility spectrometers so as to each analyse a reference compound and output ion mobility spectral data in response thereto; and adjust at least one of an operational parameter, duty cycle, or acquired spectral data of one or both of the spectrometers such that, for the same consumption of the reference compound by the spectrometers, the statistical precision of quantification and/or the statistical precision of ion mobility measurement of the spectral data output by the first spectrometer for the reference compound is substantially the same as for the spectral data output by the second spectrometer;

wherein one or both of the spectrometers has a statistical precision of quantification and/or statistical precision of ion mobility measurement that is above a preselected desired value when one or both of said spectrometers initially analyse said reference compound; and wherein said control circuitry is configured to adjust said at least one of an operational parameter, duty cycle, or acquired spectral data of said one or both of the spectrometers until the performance of one or both spectrometers is lowered such that its statistical precision of quantification and/or statistical precision of ion mobility measurement for the reference compound is at said pre-selected desired value.

* * * * *